(12) United States Patent
Corson

(10) Patent No.: US 11,508,072 B2
(45) Date of Patent: Nov. 22, 2022

(54) SMART PHONES FOR MOTION CAPTURE

(71) Applicant: Sony Interactive Entertainment Inc., Tokyo (JP)

(72) Inventor: Gregory Alan Corson, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 235 days.

(21) Appl. No.: 16/740,829

(22) Filed: Jan. 13, 2020

(65) Prior Publication Data
US 2021/0217183 A1    Jul. 15, 2021

(51) Int. Cl.
| | |
|---|---|
| G06K 9/00 | (2022.01) |
| G06T 7/246 | (2017.01) |
| H04N 5/232 | (2006.01) |
| H04N 5/225 | (2006.01) |
| G06T 7/80 | (2017.01) |
| H04N 5/235 | (2006.01) |

(52) U.S. Cl.
CPC ............. *G06T 7/246* (2017.01); *G06T 7/85* (2017.01); *H04N 5/2251* (2013.01); *H04N 5/2354* (2013.01); *H04N 5/23219* (2013.01); *G06T 2207/30204* (2013.01)

(58) Field of Classification Search
CPC . G06T 7/246; G06T 7/85; G06T 2207/30204; G06T 2207/30196; G06T 7/292; H04N 5/2251; H04N 5/23219; H04N 5/2354; H04N 5/2224; H04N 5/2226; H04N 5/23206; H04N 5/265; H04N 5/272; H04N 5/247

USPC .......................................................... 382/154
See application file for complete search history.

(56) References Cited

U.S. PATENT DOCUMENTS

| | | | | |
|---|---|---|---|---|
| 9,851,625 | B1* | 12/2017 | Fernandez | F16M 11/242 |
| 10,868,900 | B1* | 12/2020 | Lindvall | F16M 11/38 |
| 2007/0280138 | A1* | 12/2007 | Stern | H04W 12/033 370/254 |
| 2011/0025853 | A1* | 2/2011 | Richardson | H04N 5/247 348/159 |
| 2015/0235076 | A1* | 8/2015 | Aimonen | G06K 9/00342 348/157 |
| 2018/0043247 | A1* | 2/2018 | Vandonkelaar | A63F 13/428 |
| 2020/0175303 | A1* | 6/2020 | Bhat | G06K 9/00228 |

OTHER PUBLICATIONS

Image retrieved from https://www.awn.com/sites/default/files/styles/original/public/image/attached/1049232-facewaremarkiiicamerasystem02-lr.jpg?itok=KnlwlHHk.
Image retrieved from https://www.digitalartsonline.co.uk/cmsdata/features/3681061/bodyheader.jpg.

* cited by examiner

*Primary Examiner* — Stephen P Coleman
(74) *Attorney, Agent, or Firm* — John L. Rogitz

(57) ABSTRACT

A series of smart phones are mounted in respective tripods to capture motion of a person wearing markers, such as marker balls or reflectors. The videos from the phones are stripped of objects other than the markers and the videos of the markers are combined to render a 3D motion capture structure that may be applied to an image of a VR icon to cause the VR icon to move as the person originally moved.

20 Claims, 5 Drawing Sheets

SMART PHONES FOR MOTION CAPTURE

FIELD

The application relates generally to technically inventive, non-routine solutions that are necessarily rooted in computer technology and that produce concrete technical improvements.

BACKGROUND

As understood herein, motion capture systems have been provided in which multiple cameras in a space take images of an actor wearing markers such as small reflective balls or light emitting diodes (LEDs). The images of the markers are incorporated into a computer-generated character so that a video is produced of the character realistically mimicking the movement of the original actor. Some systems do not require markers and use image processing or AI to determine the position of the actor directly from multiple cameras.

SUMMARY

As also understood herein, such systems are relatively expensive because they require special high speed cameras. Moreover, such systems cannot be spontaneously set up because the cameras must be connected together and to a computer, so if a group of people gather and wish to inexpensively and spontaneously generate 3D motion capture data, they cannot do so.

As further recognized by present principles, contemporary mobile telephones and many types of consumer and prosumer cameras now have 120-240 hz cameras, considerable processing power, and one or more relatively bright lamps near the camera lens. Accordingly, present principles recognize that multiple people can gather with their mobile telephones and quickly create a motion capture setup, for example, by mounting each phone on a tripods around a stage to be captured. Software on each phone can remove objects from the video other than the tracking markers, returning the center of every marker imaged by the phone to an aggregator device, e.g., wirelessly using Wi-Fi, which may be implemented by a central computer or console or one of the phones and which combines the video from the various phones to output 3D tracking information. Or, AI can be used to directly track the position of a person's joints. This information can be used for simple tracking or for whole body motion capture.

Accordingly, in one aspect a motion tracking system includes at least one processing unit configured with executable instruction to receive coordinate information and output tracking information based thereon. The system includes plural mobile telephones each comprising at least one lamp and at least one camera and plural supports each holding one of the respective mobile telephones within line of sight of the people or objects being tracked. Each support includes at least one mount configured to closely receive a respective mobile telephone therein. Each mobile telephone is configured with executable instructions to image a space in which a person executes movements with plural markers engaged with the person to render a respective video file. The system is configured with instructions to, from each video file of each respective mobile telephone, generate a data structure of only the markers in the video file to render a respective marker file and combine the marker files to output three dimensional (3D) tracking information that represents the movements executed by the person. The system also is configured to use the 3D tracking information to create a video file of a virtual reality (VR) object.

In some embodiments, the mobile telephones are configured with instructions to generate the respective data structure of only the markers in the respective video file to render a respective marker file. The mobile telephones can be programmed to operate in concert to combine the marker files to output the three dimensional (3D) tracking information that represents the movements executed by the person in a distributed fashion. Or, the system can include at least one aggregator device such as a network or cloud server configured with instructions to combine the marker files to output the 3D tracking information that represents the movements executed by the person and to use the 3D tracking information to create a video file of a virtual reality (VR) object.

In non-limiting examples, at least one of the supports includes a tripod of legs and a base coupled to the legs. A support bar rises up from the base, and the mount is coupled to the support bar and configured to closely receive a parallelepiped-shaped mobile telephone. The mount itself may include a bottom clip for supporting a bottom edge of a mobile telephone and extending perpendicularly away from a case configured to hold sides of the mobile telephone and resilient left and right U-shaped clips extending from the case to overlap sides and front of the mobile telephone to securely hold the mobile telephone after it is snapped into the case past the clips.

In another aspect, a method includes illuminating plural moving markers using at least one lamp on a first mobile telephone and generating a video of the moving markers using at least one imager on the first mobile telephone. The method further includes illuminating the moving markers using at least one lamp on a second mobile telephone and generating a video of the moving markers using at least one imager on the second mobile telephone. The method includes using the videos from the first and second mobile telephones, generating three dimensional (3D) tracking information that represents movements of the moving markers. For motion capture purposes it is not unusual to use as few as one camera or more than a dozen. The number of cameras used depends on the size and complexity of the area being captured and how many people/objects are being captured simultaneously.

In another aspect, an assembly includes at least first and second tripod assemblies and at least first and second mobile telephones respectively supported by the first and second tripod assemblies. The assembly further includes plural reflective markers in fields of views of first and second cameras on the first and second mobile telephones. At least one processor is configured with executable instructions to receive videos of the markers from the first and second mobile telephones and from the videos generate three dimensional (3D) tracking information that represents movements of the reflective markers.

In another aspect, an assembly includes at least first and second tripod assemblies and at least first and second mobile telephones respectively supported by the first and second tripod assemblies. The assembly further includes plural objects in fields of views of first and second cameras on the first and second mobile telephones. At least one processor is configured with executable instructions to receive videos of the objects from the first and second mobile telephones and from the videos generate three dimensional (3D) tracking information that represents movements of the objects.

The objects may include reflective markers engaged with a person and the 3D tracking information represents movements of the person. The objects may be joints of real world objects and the 3D tracking information is generated using at least one neural network.

The details of the present application, both as to its structure and operation, can best be understood in reference to the accompanying drawings, in which like reference numerals refer to like parts, and in which:

DETAILED DESCRIPTION

Figure 1:
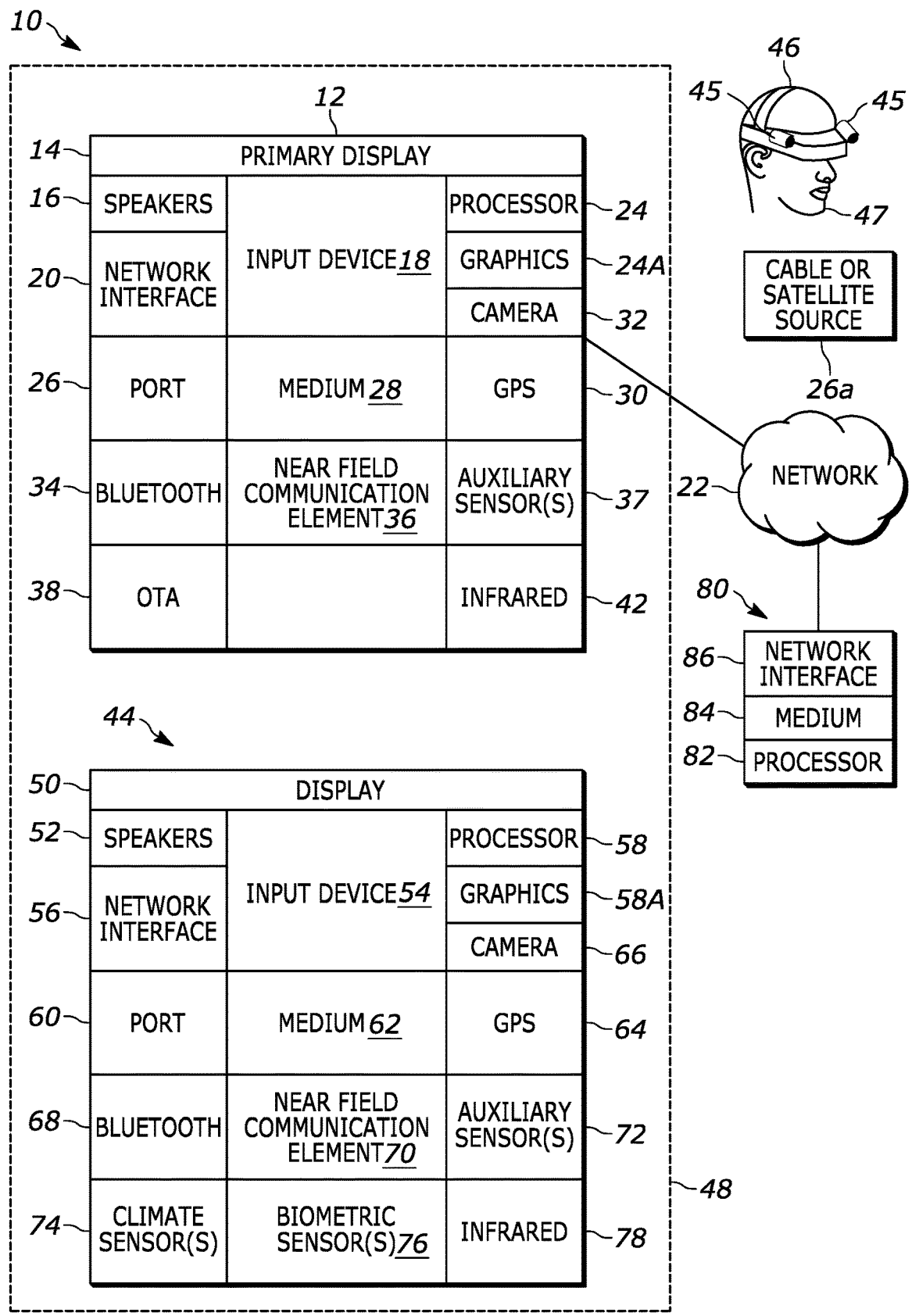
FIG. 1 is a block diagram of an example system including an example consistent with present principles.

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc.

The AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 such as a central processing unit (CPU). A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an augmented reality (AR) headset worn by the user 47 as shown. The headset 46 may be established by electronic glasses or a virtual reality (VR)-type headset that has a transparent display rather than an opaque display. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. For example, the CE device 46 may include outward-facing cameras 45 on either side of the CE device 46 and oriented in the front-facing direction of the CE device 46 itself to gather images similar to the field of view of the person/user 47 himself or herself. Either one or both CE devices may be powered by one or more batteries.

Now in reference to the afore-mentioned at least one server 80, it may include at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
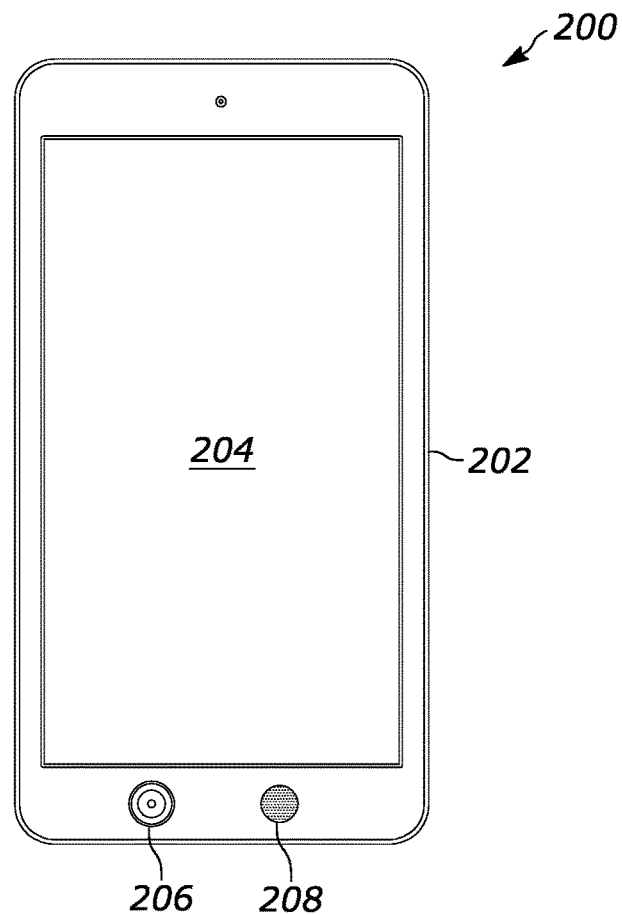
FIG. 2 is a schematic diagram of a mobile phone showing its camera and lamp.

Now referring to FIG. 2, an example of a mobile telephone 200 that may include any of the appropriate components of the CE devices described above is shown. The example mobile telephone 200 includes a lightweight plastic housing 202 with a touch screen 204 and at least one 120-240 Hz camera 206. The telephone 200 may also include one or more lamps 208 emitting visible and/or infrared (IR) light. For larger tracking areas, a clip on "ring light" can be added to a phone or camera.

Figure 3:
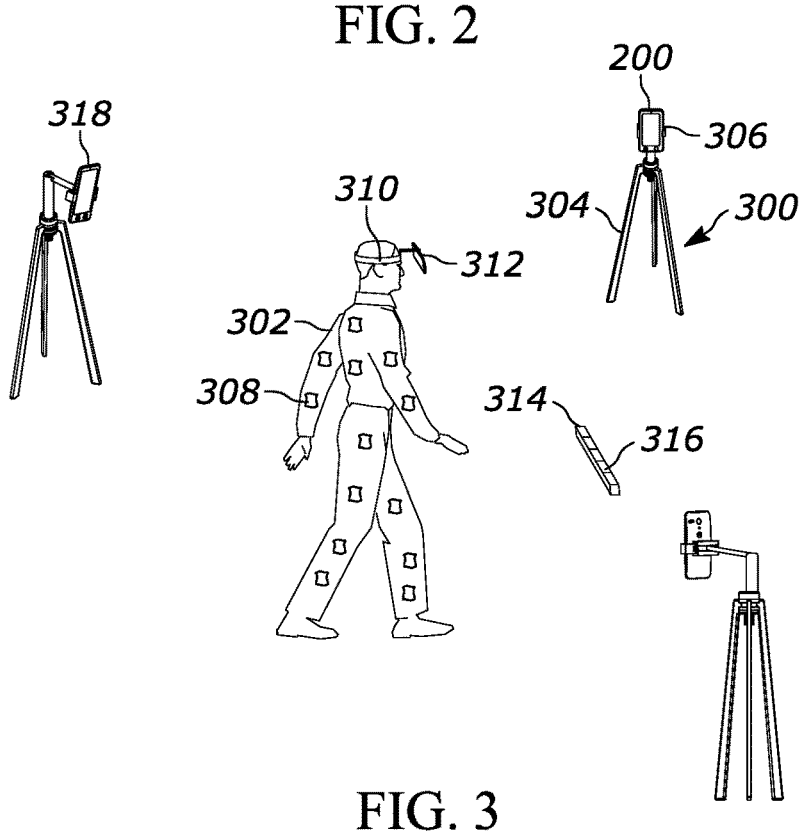
FIG. 3 is a schematic diagram of a motion capture setup.
Figure 7:
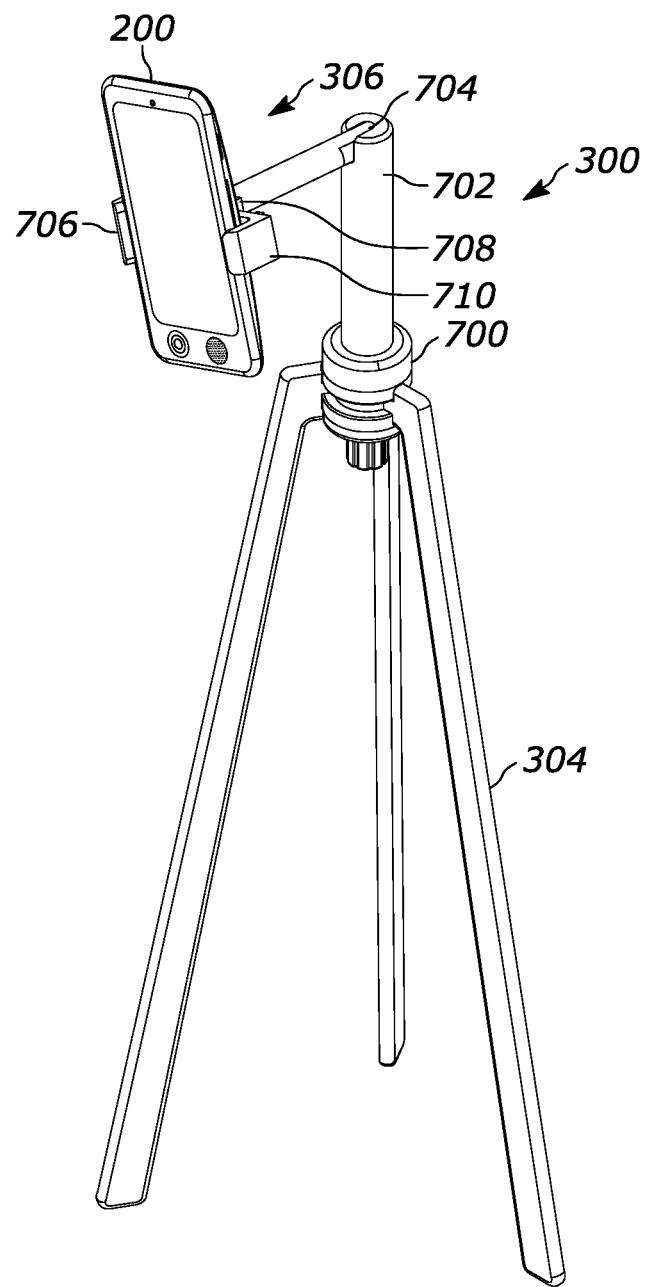
FIG. 7 illustrates an example mobile phone tripod support apparatus.

FIG. 3 shows that plural mobile telephones 200 can be mounted on respective mounts 300 in a space such as the space 48 shown in FIG. 1 to generate videos of a moving person 302. In the example shown, three phones 200 are used, it being understood that two or more phones in general may be used to produce 3D motion capture of the person 300. As shown, each support 300 is a tripod that includes three legs 304 and a mount 306 configured to closely receive a mobile telephone. Details of an example non-limiting mount 306 are shown in FIG. 7 and described further below.

As shown, the person 302 wears plural markers 308. Each marker 308 may be, e.g., a small reflective ball or other object that reflects visible and/or IR light emitted by the lamps 208 of the phones 200, which reflections are detected by the cameras 206 of the phones 200. The person 302 also may wear a head-mounted frame 310 with a camera 312 oriented to image the face of the person 302. A calibration object 314 such as a wand of known size and shape with markers 316 at known locations on the object 314 may be present for calibration purposes to be shortly disclosed.

One or more cameras 200 may be equipped with respective filters 318 if desired to help filter out objects in the video apart from the markers 208. For example, if the markers reflect IR light the filters 318 can block visible light and vice-versa.

In another embodiment, no markers are used. Instead, one or more neural networks process images of real world objects such as people to identify joints and generate the tracking information described herein.

Figure 4:
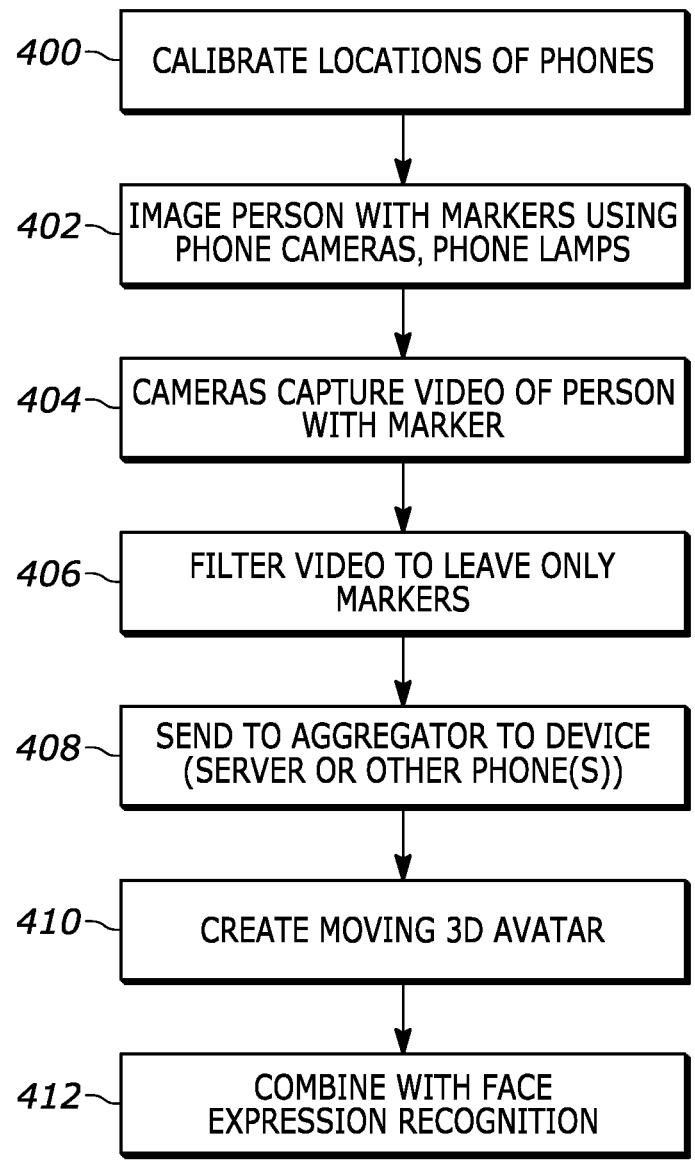
FIG. 4 is a flow chart of example overall logic consistent with present principles.

Now referring to FIG. 4, commencing at block 400 the system is calibrated. Each phone 200 may include a respective location detector such as a GPS receiver that can be accessed to provide a geographic location of the phone 200 to an aggregator device, such as one or more of the phones 200 acting in concert, a server such as the server 80 in FIG. 1, and combinations thereof. In addition to or in lieu of using GPS to determine location, simultaneous localization and mapping (SLAM), wireless signal triangulation, received signal strength indicator (RSSI) processing, etc. and other indoor location determination methods may be used.

The purpose of calibration ultimately is to correlate images of the markers 308 from the various phones 200. Given the absolute location of the phones 200, the system can be programmed to compare images of, e.g., the calibration wand 314 having known size and shape and markers 316 at known locations on the wand to determine the positions of the cameras 200 with respect to each other by comparing the images from each camera of the wand 314 with markers 316. Once the locations of the phones 200 (and relative orientations of the images from each phone 200) are calibrated, subsequent images of the person 302 with wearable markers 308 are correlated such that each marker 308 in each image is correlated with the same marker 308 in the other images.

Once calibrated, the system logic can move to block 402 in which each camera 200 generates video images of the person 302 executing movement. In doing so, the person 302 may be illuminated by the phone lamps 208. In this way, each camera 200, from its respective perspective, captures a video of the moving person at block 404.

If desired, the cameras 200 may provide their respective videos of the person to an aggregator device to execute block 406 or each camera may be programmed to execute block 406 on its own video. At block 406 the video is filtered of objects other than the markers 308. This may be done by using the filters 318 on each camera to filter out all wavelengths from the video other than those reflected by the markers 308. Or, the markers may be black objects such as balls and the illuminating light may be in the IR spectrum such that only reflections of light from the markers are captured in the videos generated by the phones 200.

In any case, the filtered videos (if filtering is done by each individual phone 200) may be sent to the aggregator device(s) at block 408 to aggregate the videos of the markers to create at block 410 a data structure of three dimensional (3D) tracking information of the markers 308 over time that represents the movements executed by the person 302. This may be done by the processor(s) of the aggregator using instructions typically used in the case of the expensive special purpose cameras discussed above, e.g., as provided by "Autodesk motion builder", "iPisoft pro", "Viacom", or "optitrack" (one or more of such terms possibly being trademarked).

If desired, image recognition may be executed on images from the head-borne camera 312 of the face of the person 302, and these images may be synchronized with the 3D tracking information from block 410 and combined at block 412 with the 3D tracking information into a model of an avatar or other object for use in virtual reality (VR) or augmented reality (AR) to create a video file of a virtual reality (VR) object.

Thus, the videos of the person 302 with markers 308 taken in an enclosed space can be processed and combined to generate 3D motion capture information. Information from each phone 200 can be sent to other computers/servers for processing, or the phones 200 can share video information and in concert use distributed processing to generate the final 3D tracking information.

Figure 5:
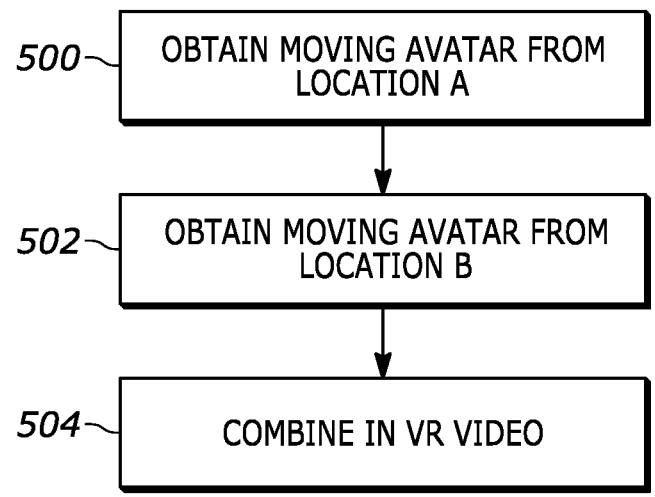
FIG. 5 is a flow chart of example virtual reality (VR) avatar generation logic consistent with present principles.
Figure 6:
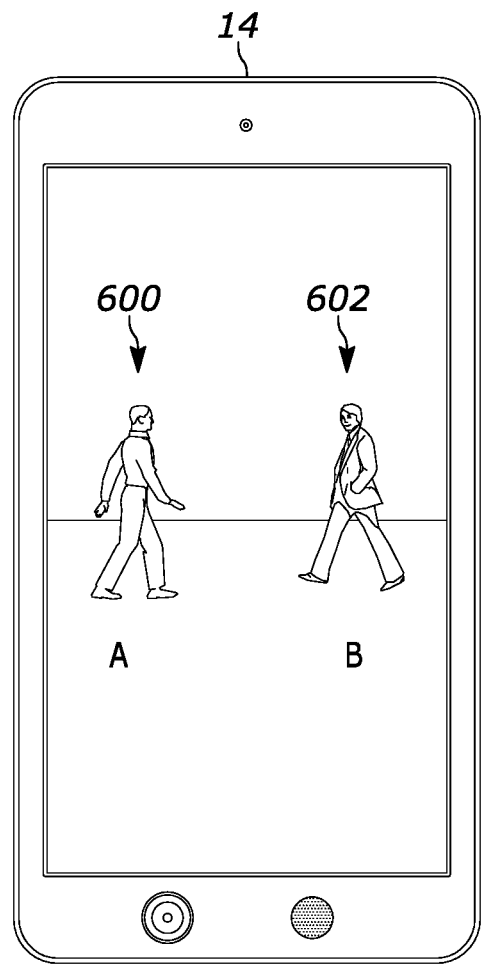
FIG. 6 is a screen shot of an VR video generated by the logic of FIG. 5.

With the above in mind, duplicate phone-based systems can be set up in two or more respective locations remote from each other (e.g., different cities or states) to generate 3D motion capture (and if desired face image data) on respective players, who can then each create his or her own avatar to have the avatar move in 3D VR space according to the movement of each person imaged wearing markers 308. FIGS. 5 and 6 illustrate. At block 500 a first moving avatar is generated in accordance with principles above using motion capture of a first person at a first location while at block 502 a second moving avatar is generated in accordance with principles above using motion capture of a second person at a second location. The moving avatars can be combined in the same VR space as indicated at block 504 and as shown in FIG. 6, in which two avatars 600, 602 move in a VR space. Each avatar may be rendered with the same facial expressions of the person that was imaged while generating the motion data.

Example use cases include but are not limited to 3D chat programs in which plural people assume respective avatars and interact in virtual space, virtual/VR game production, talking head video with, e.g., a famous city or landmark in the background, animated production, and VR computer games to have the character do what the person wearing the markers 308 wants it to do. In general, physical human movement may be converted into avatar/VR character movement.

FIG. 7 illustrates an example mount 306 that can be used to a hold a phone 200. A base 700 may be coupled to plural legs, e.g., three legs 306 with a central support bar 702 rising up from the base 700. At or near an upper end the bar may be formed with an articulating joint 704 that can be moved as desired to orient the camera of the phone 200 in the desired position.

The support bar 702 may terminate in the mount 306. In the example shown the mount 306 is configured to closely receive a parallelepiped-shaped mobile telephone, and may include bottom clips 706 for supporting the bottom edge of the phone 200 and extending perpendicularly away from a case 708 that holds the sides of the phone. Resilient left and right U-shaped clips 710 may extend from the case 708 to overlap the side and front of the phone to securely hold the phone 200 after it is snapped into the case 708 past the clips 710.

It will be appreciated that whilst present principals have been described with reference to some example embodiments, these are not intended to be limiting, and that various alternative arrangements may be used to implement the subject matter claimed herein.

What is claimed is:

1. A motion tracking system, comprising:
at least one processing unit configured with executable instruction to receive coordinate information and output tracking information based thereon;
plural mobile telephones each comprising at least one lamp and at least one camera;
plural supports each holding one of the respective mobile telephones within line of sight of each other, each support comprising at least one mount configured to receive a respective mobile telephone therein;
each mobile telephone configured with executable instructions to:
image a space in which a person executes movements, plural markers being engaged with the person, to render a respective video file;
the system being configured with instructions to:
from each video file of each respective mobile telephone, generate a data structure of only the markers in the video file to render a respective marker file;
combine the marker files to output three dimensional (3D) tracking information that represents the movements executed by the person; and
use the 3D tracking information to create a video file of a virtual reality (VR) object.

2. The system of claim 1, wherein the mobile telephones are configured with instructions to generate the respective data structure of only the markers in the respective video file.

3. The system of claim 1, wherein the mobile telephones are configured with instructions to, from its respective video file, generate a data structure of only the markers in the respective video file to render a respective marker file.

4. The system of claim 3, wherein the mobile telephones are configured with instructions to operate in concert to combine the marker files to output the three dimensional (3D) tracking information that represents the movements executed by the person.

5. The system of claim 1, wherein the system comprises at least one aggregator device configured with instructions to combine the marker files to output the 3D tracking information that represents the movements executed by the person and to use the 3D tracking information to create a video file of a virtual reality (VR) object.

6. The system of claim 5, wherein the aggregator device comprises at least one network server configured to communicate with the mobile telephones.

7. The system of claim 1, wherein at least one support comprises:
at least a tripod of legs and a base coupled to the legs; and
at least one support bar rising up from the base, the mount being coupled to the support bar and configured to closely receive a parallelepiped-shaped mobile telephone.

8. The system of claim 7, wherein the mount comprises:
at least one bottom clip for supporting a bottom edge of a mobile telephone and extending perpendicularly away from a case configured to hold sides of the mobile telephone; and
resilient left and right U-shaped clips extending from the case to overlap sides and front of the mobile telephone to securely hold the mobile telephone after it is snapped into the case past the clips.

9. A method comprising:
illuminating plural moving markers using at least one lamp on a first mobile telephone;
generating a video of the moving markers using at least one imager on the first mobile telephone;
illuminating the moving markers using at least one lamp on a second mobile telephone;
generating a video of the moving markers using at least one imager on the second mobile telephone; and
using the videos from the first and second mobile telephones, generating three dimensional (3D) tracking information that represents movements of the moving markers.

10. The method of claim 9, comprising engaging the markers with a person, the 3D tracking information representing movements of the person.

11. The method of claim 9, comprising using the 3D tracking information to create a video file of a virtual reality (VR) object.

12. The method of claim 9, comprising mounting the first and second mobile telephones on respective first and second tripod assemblies to orient the mobile telephones to image the moving markers.

13. The method of claim 12, wherein at least the first tripod assembly comprises:
at least a tripod of legs and a base coupled to the legs; and
at least one support bar rising up from the base, the mount being coupled to the support bar and configured to closely receive a parallelepiped-shaped mobile telephone.

14. The method of claim 13, wherein the mount comprises:
at least one bottom clip for supporting a bottom edge of a mobile telephone and extending perpendicularly away from a case configured to hold sides of the mobile telephone; and
resilient left and right U-shaped clips extending from the case to overlap sides and front of the mobile telephone to securely hold the mobile telephone after it is snapped into the case past the clips.

15. An assembly comprising:
at least first and second tripod assemblies;
at least first and second mobile telephones respectively supported by the first and second tripod assemblies;
plural objects in fields of views of first and second cameras on the first and second mobile telephones; and
at least one processor configured with executable instructions to receive videos of the objects from the first and second mobile telephones and from the videos generate three dimensional (3D) tracking information that represents movements of the objects.

16. The assembly of claim 15, wherein the objects are reflective markers engaged with a person and the 3D tracking information represents movements of the person.

17. The assembly of claim 15, wherein the processor is configured with instructions to use the 3D tracking information to create a video file of a virtual reality (VR) object.

18. The assembly of claim 15, wherein the at least one processor is implemented in at least one of the mobile telephones and/or in at least one server configured for communicating with the mobile telephones.

19. The assembly of claim 15, wherein the objects comprise joints of real world objects and the 3D tracking information is generated using at least one neural network.

20. The assembly of claim 15, comprising at least first and second lamps on the first and second mobile telephones illuminating the reflective markers.

* * * * *